United States Statutory Invention Registration [19]

[11] Reg. Number: H554

Dawson et al.

[43] Published: Dec. 6, 1988

[54] TOROIDAL REACTOR

[75] Inventors: John M. Dawson, Pacific Palisades, Calif.; Harold P. Furth; Fred H. Tenney, both of Princeton, N.J.

[73] Assignee: The United States of America as represented by the United States Department of Energy, Washington, D.C.

[21] Appl. No.: 354,418

[22] Filed: Mar. 3, 1982

Related U.S. Application Data

[63] Continuation of Ser. No. 150,395, May 16, 1980, abandoned, which is a continuation of Ser. No. 904,673, May 10, 1978, abandoned, which is a continuation-in-part of Ser. No. 649,949, Jan. 27, 1976, abandoned, which is a continuation of Ser. No. 411,503, Oct. 13, 1973, abandoned, which is a continuation of Ser. No. 231,324, Mar. 2, 1972, abandoned.

[51] Int. Cl.[4] ..... G21B 1/00

[52] U.S. Cl. ..... 376/107; 376/130; 376/133; 376/140; 376/142; 376/143; 376/146; 376/147

[58] Field of Search ..... 376/107, 130, 133, 140, 376/146, 147, 142, 143

[56] References Cited

U.S. PATENT DOCUMENTS

| | | | |
|---|---|---|---|
| 3,052,617 | 9/1962 | Post | 176/5 |
| 3,113,082 | 12/1963 | Imhoff et al. | 176/5 |
| 3,141,826 | 7/1964 | Friedrichs et al. | 176/7 |
| 3,663,361 | 5/1972 | Yoshikawa | 176/3 |
| 3,702,163 | 11/1972 | Furth et al. | 176/3 |
| 3,713,967 | 1/1973 | Hamilton et al. | 176/5 |
| 3,755,073 | 8/1973 | Haught et al. | 176/1 |
| 3,764,466 | 10/1973 | Dawson | 376/140 |
| 4,057,462 | 11/1977 | Jassby et al. | 176/5 |

FOREIGN PATENT DOCUMENTS

| | | | |
|---|---|---|---|
| 848346 | 9/1960 | United Kingdom | 176/5 |

OTHER PUBLICATIONS

Phy. Rev. Lett., 5/71, Dawson et al (I), vol. 26, No. 19, pp. 1156–1160.
MATT-Q-28, Jan. 1-Dec. 31, 1970, pp. 31–34.
ORNL-4688, 8/71, pp. 44–54.
MATT-841, 5/71, Dawson et al (II), pp. 1–11.
"A Driven Thermonuclear Power Breeder", 1/54, Imhoff, pp. 1–22.
LWS-24920 (revised), pp. 1–13, Powell, Oct. 1953.
Glasstone, S. and Lovberg, R. H., *Controlled Thermonuclear Reactions,* Robert E. Krieger, FL, Reprint, 1975 (original printing and copywright 1960), pp. 65–66.

*Primary Examiner*—Harvey E. Behrend
*Attorney, Agent, or Firm*—Jeanette M. Walder; Paul A. Gottlieb; Judson R. Hightower

[57] ABSTRACT

Method for producing fusion power wherein a neutral beam is injected into a toroidal bulk plasma to produce fusion reactions during the time permitted by the slowing down of the particles from the injected beam in the bulk plasma.

7 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TOROIDAL REACTOR

This invention arose in the course of a contracts with the U.S. Atomic Energy Commission.

This is a continuation of application Ser. No. 150,395, filed May 16, 1980, now abandoned; which was a continuation of Ser. No. 904,673, filed May 10, 1978, now abandoned; which was a continuation-in-part of Ser. No. 649,949, filed Jan. 27, 1976, now abandoned; which was a continuation of Ser. No. 411,503, filed Oct. 13, 1973, now abandoned; which was a continuation of Ser. No. 231,324, filed Mar. 2, 1972, now abandoned.

BACKGROUND OF THE INVENTION

In the field of physics a need exists for high temperature plasmas of ions and electrons. Various means and appratus have been proposed and used for providing such plasmas comprising the toroidal research reactors at Princeton University referred to in the art as stellarators. Such torodial configurations are described and shown in U.S. Pat. Nos. 3,278,384 by Leonard et at., entitled "Negative Stellarator"; 3,016,341 by Spitzer, Jr., entitled "Reactor"; 3,002,912 by Spitzer, Jr., entitled "High Temperature Apparatus". In an effort to achieve a hot dense plasma, several techniques have been employed. Furth et al, in U.S. Pat. No. 3,702,163 discloses a device for heating and compressing a plasma colum. Another method for heating a plasma is disclosed in U.S. Pat. No. 3,713,967 to Hamilton et at. in which a neutral particle beam is injected into the containment zone of a reactor vessel in order to heat the plasma and in U.S. Pat. No. 3,755,073 to Haught et al. in which a neutral particle beam is injected into a target plasma to maintain a high plasma temperature due to thermal collision between the ionized beam particles and the plasma. While these and the other torodal plasma research reactors used heretofore have been successful research reactors, they have had to meet the criteria of the well-known Lawson's minimum condition on $n_1\tau_E$,which is the product of the ion density $n_i$ and the plasma energy confinement time $\tau_E$, in order to generate sufficient thermal power to recreate the electrical power invested in producing the plasma. A theoreticla dicussion of this Lawson criteria is provided in Proc. Phys. Soc., B (London 70, 6(1957)).

It is an object of this invention to operate a plasma reactor to provide a plasma of ions and electrons under conditions less restrictive than the above-mentioned Lawson criteria.

It is another object to provide a two-component plasma.

It is another object to provide energy multiplication in a toroidal plasma column.

It is another object to produce fusion reactions in a toroidal plasma column by neutral beam injection.

It is another object to provide a two-component plasma in a stellarator and a tokamak.

It is another object to expand a plasma for the removal of theremal power therefrom.

It is another object to provide a plasma reactor for fissioning material in a blanket around a plasma column, or a blanket of fertile material such as $Th^{232}$ for breeding fission fuel such as $U^{233}$ which may be used in conventional nuclear reactors.

It is another object to provide a plasma-producing device that is capable of creating a hot, dense plasma suitable for high energy plasma research.

This invention is also useful for ionizing gases and solids and for producing light and other electromagnetic spectra from an ionized gas or plasma; it is useful for examining the properties, constituents and other features of high temperature gases or plasmas; it is useful for quality control purposes such as determining the impurities in pellets, jets and gases containing elements that are used in materials for tokamaks; it is useful for vaporizing a solid or for ionizing a gas in a short enough period of time to provide a quality control diagnostic, and it is useful for magnetically confining a plasma for a sufficient period of time to provide a quality control diagnostic.

SUMMARY OF THE INVENTION

It has now been determined that by injecting an energetic neutral beam into a relatively cold compressed bulk plasma, that in additon to the theremal collisions between the ionized beam particles that are taught in the prior art, additonal nuclear colisions will occur to an unexpected extent. In fact, so many additonal nuclear collisions have been found to occur that the Lawson criterial ($n\tau$) which is a function of temperature no longer totally describes the phenomenon taking place within the tokamak. Because of the presence of additional fusion reactions that create additional energetic neutrons, the number of fusion reactions due to other plasma particle collisions needed to satisfy the conditions for Lawson's critera is significantly lessened.

It will be appreciated that similar results will follow where the neutral beam is injected into the uncompressed plasma at an energy greater than the average energy of the plasma, and the beam particles and the plasma are compressed together. Where the beam is injected prior to compression, it can be injected at a lower energy level since it will gain energy during compression and will therefore remain at an energy above that of athe bulk plasma ions.

This invention relates to an apparatus and method for operating a plasma reactor to produce energetic reactions by neutral beam injection into a bulk plasma in a plasma reactor. In one embodiment, this invention injects a neutral deuterium beam into a relatively cold, toroidal, bulk trition target plasma to produce fusion reactions directly by collisions in the target plasma during the time the injected beam particles slow down. In one example, the bulk plasma temperature is maintained by neutral beam inection into a stellarator having a magnetic mirror configuration. In another example, this invention provides a bulk plasma in a tokamak with a neutral beam injected therein. In another aspect, this invention provides fission of $U^{238}$ in a blanket around the plasma. In still another aspect, this invention compresses a plasma and extracts energy therefrom by reexpansion of the plasma. With the proper selection of apparatus and method of using the apparatus, as described in more detail hereinafter, the desired operation, method, appratus and reactions are achieved.

This invention is advantageous in that it provides an energy output from fusion reactions. This invention provides specific reactors and reactions involving a combination of elements that are improvements on the prior art devices. In this regard, this invention is less restrictive than the heretofore known Lawson plasma energy release criteria in that it provides injection of a neutral beam into a bulk plasma to produce fusion by collision and permits significant power producing fusion reactions during the described "slowing" process.

Specific torodial reactors are provided comprising specific stellarators and tokamaks forming adiabatic toroidal compressors. Also, specific energy multiplication systems and power production systems are contemplated, such as the direct and indirect power conversion systems known heretofore. Also, novel non-fusion power producing systems are provided. Among these latter are a novel fusion-fission means and a plasma expansion means. Additionally, divertor extraction means and tritium production means are provided. The above and further novel features and objects of this invention will become apparent from the following detailed description when read in connection with the attached drawings of two embodiments thereof, and the novel features will be particularly pointed out hereinafter in the appended claims.

BRIEF DESCRIPTION OF THE DRAWINGS

In the drawings where like elements are referenced alike:

FIG. 6*a* illustrates a detailed view of the transition between mirror and stellarator regions. The ends of an l=2 Ioffe mirror machine are partly circularized and connected to an l=2 stellarator. The field strength in the stellarator sectionid the same as at the mirrors of the Ioffe section.

DESCRIPTION OF THE PREFERRED EMBODIMENT

Figure 1:
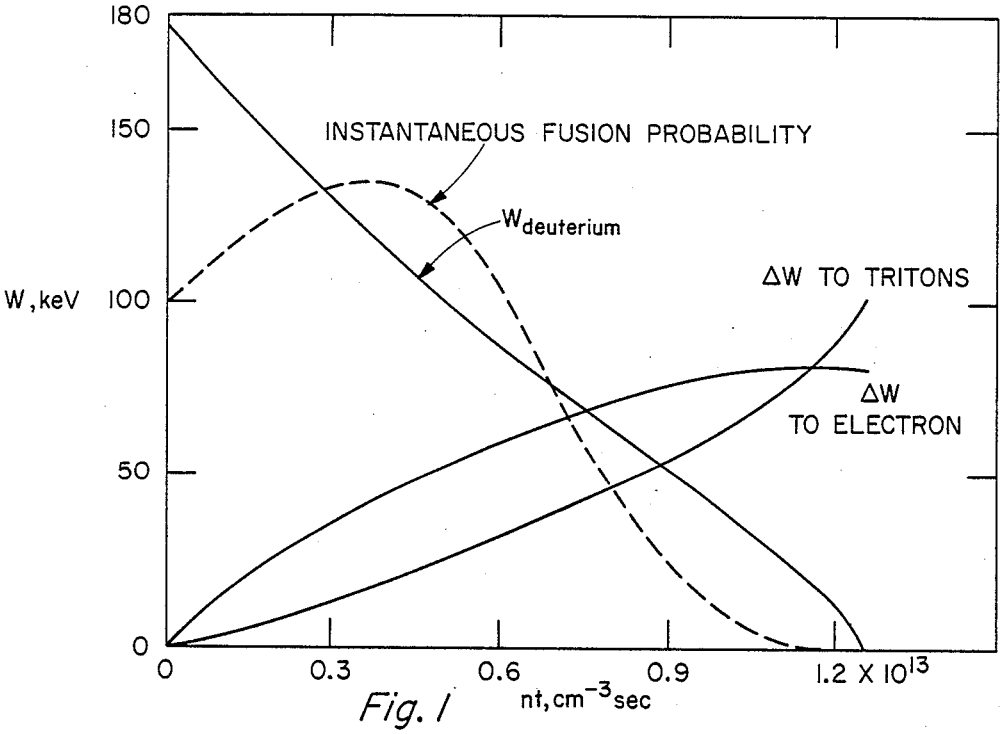
FIG. 1 is a graphic illustration of the instantaneous reaction probability of a neutral beam that bombards a magnetically confined bulk plasma in which a 180-keV deuteron slows down in bulk tritium plasma of $T_e=5$ keV, $T_i=0$. Instantaneous probability of fusion and division of deuteron energy between electrons and tritons are also shown. (the 1 factors are calculated at $n=3\times10^{13}$ cm$^{-3}$.)

This invention is useful in the field of plasma physics. To this end, this invention provides plasma particles that are confined in a strong toroidal magnetic field, e.g., from several KG up to 150 KG or more at densities of up to $10^{12}$ particles/cm$^3$ or more. Suitable species of ions in the plasma comprise deuterons, $He^3$ and tritons. The invention operates mainly with a two-component plasma. An energetic or high-temperature neutral deuterium beam is injected and retained in the lower-temperature bulk tritium plasma as an energetic ion component which interacts with the existing background plasma ions. This two-component plasma gives rise to more rapid fusion reactions than would be achieved when operating with a single-component plasma, where tritium and deuterium ions are at the same bulk plasma temperature.

In understanding this invention, it is known that suitable plasma confinement means, such as the well-known stellarators described in the above-mentioned publications, can magnetically confine high temperature one-component plasmas having a substantially uniform Maxwellian temperature distribution in a plasma column in a toroidal vacuum chamber. In this regard, these plasma confinement means have previously been designed to heat and confine a relatively warm to holt bulk plasma, in which case the attainment of thermonuclear reactions requires the meeting of the well-known Lawson criterion, i.e., $n_i\tau_E$ (the product of the ion density and plasma energy confinement time), as defined above. Should these heretofore known plasma confinement and heating means, which are incorporated by reference herein and used in accordance with this invention, be adapted to confine a cold triton plasma, this invention produces fusion reactions therefrom by injecting a neutral beam thereinto. In this regard, the well-known Lawson criterion is greatly relaxed in accordance with this invention. To this end, in connection with a generalization of Lawson's criterion, one case is provided by this invention where the bulk plasma temperature, comprising the $T_e$ (electron temperature) and the $T_i$ (ion temperature), is maintained by injection of a neutral beam of ions that gives rise to an energetic ion component of density $n_n<<n_i$ and initial $W_o>>T_e$, $T_i$, these terms being defined for ease of reference as follows:

$T_e$=electron temperature of bulk plasma $T_i$=ion temperature $n_h$=density of energetic injected ions in the plasma $n_i$=ion density of bulk plasma $W_o$=initial deuteron energy As discussed in Physical Review Letters, Vol. 26, No. 19 at page 1156, if, on the average, an injection ion produces F times its initial energy in fusion reactions before slowing down in a magnetically confined bulk plasma colum in a torodial vacuum container, then the condition for electrical power generation can be written approximately in the form $$n_n F > 1 - n_p \quad (1)$$

The efficiencies of conversion to electrical energy from fusion reation energy and plasma energy, respectively, are given by $n_n$ and $n_p$. For simplicity, the fusion reactions of the bulk plasma ions with each other and of the erergetic ions with each other, as well as the favorable effects arising from the disposition of charged fusion reaction products within the plasma, are temporarily neglected along with the rate of energetic ion loss $\tau_{hl}^{-1}$ from the plasma volume, assuming a choice of parameters such that the rate of thermalization $\tau_{hc}^{-1}$ within the plasma is several times higher. Also, a resonalbly high neutral beam injection efficiency is provided.

It is found that Eq. (1) above is readily satisfied for a plasma of energetic deuterons injected into a magnetically confined bulk plasma column of tritium ions, the obtainable multiplication factor F being as large as 2–3, assuming the standard fusion energy release, such as described by Glasstone and Lovbern in "Controlled Thermonuclear Reactions", Van Nostrand, 1960. Moreover, this multiplication factor F can be increased by an appropriate blanket design around the magnetically confined plasma column as described in more detail hereinafter. From the thermodynamic point of view, the efficiency $n_p = \frac{2}{3}$ and of $n_n = \frac{1}{3}$, Eq. (1) can be met for $F > 1$, i.e., a multiplication factor $F > 1$ for the average energy that an injected ion produces in fusion reactions before slowing down in the bulk plasma.

To permit appreciable F values, the electron temperature must be in the keV range, but this is a range provided in the prior art stellarators where that temperature range was required with a low ion temperature range for preventing plasma instabilities. In accordance with this invention, then, the requirement to maintain the temperture of the ion component and the bulk plasma sufficiently high to insure satisfactional Lawson's criterion is considerably relaxed, as explained below. Moreover, surprisingly, it is found in accordance with this invention that even with a bulk plasma of relatively cold tritium ions lower in temperature than the previously required ion temperature range that is obtainable by adapting conventional stellarator apparatus to this invention, the conditions for fusion reaction production are favorable. However, for a sufficeiently high ion density/injection density, i.e., $n_i/n_n$, the bulk plasma must satisfy $T_i \approx T_e$, where $T_i$=the ion temperature and $T_e$=the electron temperature. A further discussion is provided in Princton University Plasma Physics Laboratory Report MATT-834 and Phys. Rev. Letters, 26, 1156 (1971), by the inventors of this application, which describes the advantages of the energy multiplication system of this invention.

As a practical example of the parameters of one embodiment of this invention, individual, energetic, singly-charged ions injected at an initial $W_o$ into the bulk plasma of the above-mentioned magnetically confined plasma column slow down by Coulomb scattering approximately according to the equation:

$$\frac{dW}{dt} = -\frac{4e^4 \ln\Lambda}{v}\left[\frac{n_i}{m_i} + \frac{4}{3\sqrt{\pi}}\frac{n_e}{m_e}\left[\frac{m_e W}{m_h T_e}\right]^{3/2}\right] \quad (2)$$

where the terms thereof are defined for ease of reference as follows:

e=electron charge
v=velocity of energetic ions
n=logarithmic factor due to small angle encounters
$m_i$=target ion mass
$n_e$=electron density
$m_e$=electron mass
W=energy of energetic ions
$m_n$=injected ion mass
$T_3$=electron temperature Here also, the energetic injected and target ion masses are $m_h$ and $m_i$ respectively. The velocity v of the energetic injected ions is large compared with that of the individual bulk ions in the target plasma and small compared with that of the individual electrons at temperature $T_e$ in the target plasma. The electron density $n_e$ is given by $n_e = n_i + n_h$, as defined above, but for ease of explanation, consider $n_h << n_i$, so that $n_e = n_i$. The quantity $\ln\Lambda$ is about 20 for the parameter range for this example, wherein an illustrative case is calculated from the exact relation for dW/dt that is given in FIG. 1. In this case, 180-keV deuterons from the injected neutral beam are decelerated by a tritium target plasma with $n_i = n_e$, $T_e = 5$ keV, and $T_i = 0$. The instantaneous probability of fusion is also shown in FIG. 1 with the time integral of the curve thereof giving a fusion probability factor f=0.0115. With a total energy yield of up to E=22.4 MeV per fusion reaction, as these terms are understood in the art from the above, the ratio of mean energy release to injected energy is given by $F = f\,E/W_o = 1.43$. FIG. 1 also shows the relative magnitude of the energy losses to the target electrons and ions. As can be seen from Eq. (2), the electron drag term (the second term) can be eliminated by going to a sufficiently large $T_e$.

Figure 2:
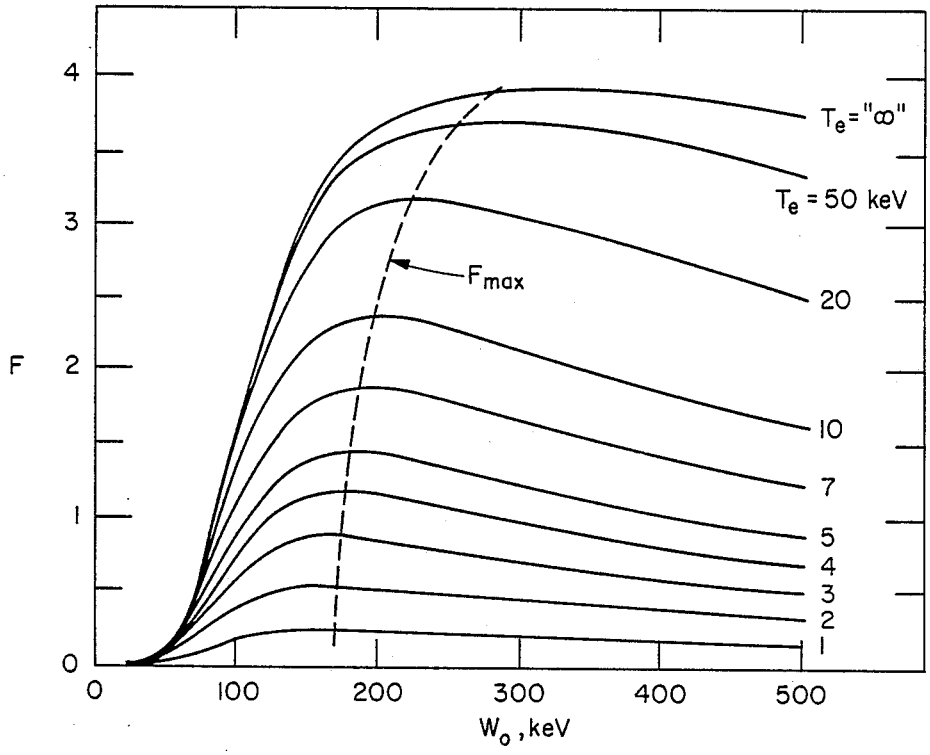
FIG. 2 is a graphic illustration of the results of FIG. 1 at a variety of energies and target electron temperatures. The figure represents the energy multiplication factor F as a function of deuteron injection energy $W_0$ for various electron temperatures of cold-triton-target plasma, assuming total energy release of 22.4 Mev.

Results for a variety of the injection energy and target plasma electron temperature parameters of this example are summarized in FIG. 2. It is seen therefrom that the energy multiplication factors greater than 1 are readily obtained, even for relatively cold target ions, as described above, and for target plasma electron temperatures well below the characteristic range (10–20 keV) of the one component Maxwellian plasma known or required in the toroidal reactor regimes known heretofore, e.g., in the above-mentioned stellarators and/or the tokamaks described hereinafter and which are incorporated by reference herein.

The time scale for the thermalization of the energetic injected ions may be written in the form:

$$n_i \tau_{hc} = (\sigma_c v)_0^{-1} \quad (3)$$

with the latter quantity of Eq. (3) calculated from Eq. (2) at the energy of injection: $(\sigma_c v)_o = (dW/dt)_o(-\eta_i W_o)^{-1}$. Writing Eq. (3) in terms of the energetic-ion loss time $\tau_{hl}$, rather than in terms of thermalization time $\tau_{hc}$ (initially assumed to be shorter), gives the more severe condition $n_i \tau_{hl} >> (\sigma_c v)_o^{-1}$.

A second "$\eta\tau$-type" criteria can be derived from the balance of the neutral-beam input power and bulk-plasma energy loss rate $E^{-1}$:

$$\frac{n_h W_o}{\tau_{hc}} \geqq n_i \frac{(T_i + T_e)}{\tau_E}. \quad (4)$$

Using Eq. (3), gives $$n_h \tau_E \geqq \sigma_c v)_o^{-1} \frac{T_i + T_e}{W_o}. \quad (5)$$

There is a range of possible operating regimes contemplated by this invention, and these are characterized by the free parameters $\Gamma = n_h W_o / n_i (T_i + T_e)$, which measures the relative energy content of the hot ions and the bulk plasma in the described magnetically confined plasma column. The following conditions can be written from Eq. (5) and Eq. (3) in terms of $\Gamma$, namely:

$$n_i \tau_E \geqq \Gamma^{-1} (\sigma_c v)_o^{-1}. \quad (6a)$$

and $$n_h \tau_{h1} >> n_h \tau_{hc} = \Gamma (\sigma_c v)_o^{-1} \frac{T_i + T_e}{W_o}. \quad (6b)$$

which serve to characterize the separate "$n\tau$" of each component.

Taking $\Gamma > 1$, then the condition of $n_i \tau_E$ is relaxed at the expense of $n_h \tau_{h1}$. In this case, it becomes possible to have $T_i >> T_e$, since $\tau_{hc} \geqq \tau_E$ is permissible.

Of those operating ranges of this invention described above, the most advantageous range is $\Gamma > 1$. Here, the requirements of the bulk plasma in the magnetically confined plasma column are then conveniently relaxed in respect to both $n_i \tau_E$ and $T_i/T_e$; while the requirements on the energetic ion $n_h \tau_{h1}$ remain very lenient. In this regard, $\Gamma = 1$ maximizes the fusion power density for a fixed plasma energy density, giving optimal ratios slightly above those for the heretofore known magnetically confined Maxwellian plasma column. The limit $\Gamma << 1$ is of interest chiefly as a transition stage on the way to the ordinary Maxwellian thermonuclear reactors known heretofore.

Figure 3:
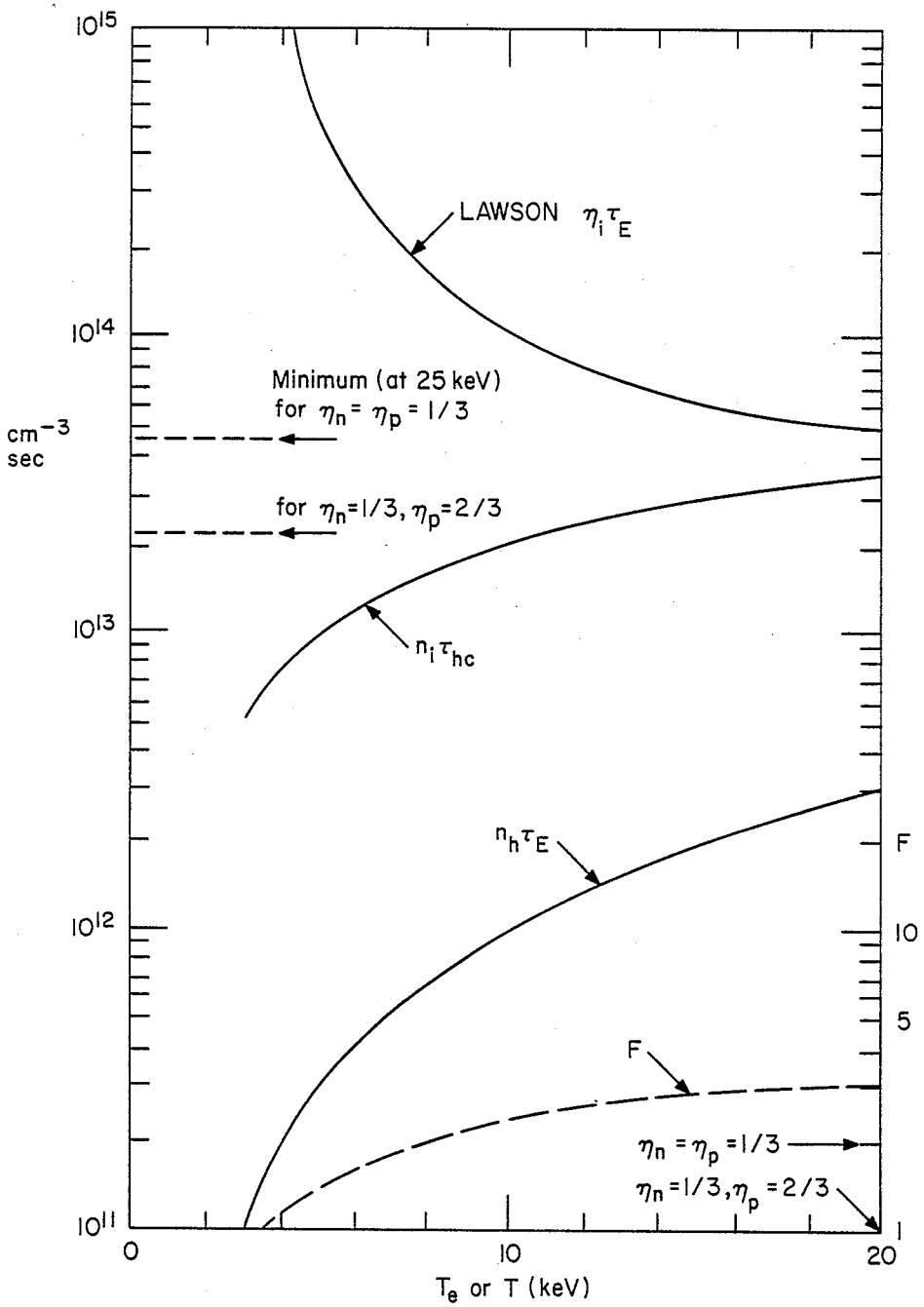
FIG. 3 is a graphic illustration comparing the results of FIG. 2 with the Lawson criterion for $n_i\tau_E$, assuming $n_n=n_p=\frac{1}{3}$, where $n_n$ and $n_p$ are the efficiencies of energy recovery from the neutrons and the plasma, with a Maxwellian plasma (equal parts of deuterium and tritium) and $T_e=T_i=T$. Minima of $n_n\tau_E$ are shown for both $n_p=\frac{1}{3}$ and $\frac{2}{3}$. $n_i T_{he}$ and $n_h\tau_E$ are given as functions of $T_e$, assuming deuterons with $W_0$ corresponding to maxima of F in FIG. 2, and cold bulk tritons. Corresponding F values are shown: $F\geqq1$ is required for $n_n=\frac{1}{3}$ and $n_p=\frac{2}{3}$, and $F\geqq2$ for $n_n=n_p=\frac{1}{3}$.

FIG. 3 compares Eqs. (3) and (5) with the standard Lawson criterion. While the two component "$n\tau$" values are very favorable, in that they are considerably less than the values of $n_i \tau_e$ required to satisfy the Lawson criteria, this graph exaggerates the relative improvement with decreasing $T_e$, since F also drops, as shown, thus requiring higher $n_p$.

The above assumes that the energetic injected ions lose their energy predominately to the background plasma, and the loss rate is classical. Accordingly, the following examines these assumptions. In this regard, in accordance with this invention the injection of a nearly isotropic distribution function is advantageous.

In contrast with the open-ended plasma heating and confinement systems known heretofore, such as described and shown in the above-mentioned Glasstone publication, plasmas with an isotropic plasma velocity distribution function can be confined in the closed configuration of this invention. In an axisymmetric torus, the above-mentioned isotropy is limited only by losses due to large ion "banana" orbits of the well-known trapped particles described in Nucl. Fusion II, 67 (1971) and understood in more detail hereinafter, but such orbits can be made small enough compared with the radius of the described toroidal, magnetically confined, bulk plasma column with the aid of large enough magnetic fields. Large "banana" orbits produce rapid losses and an anisotropy of the distribution function and hence an instability and rapid slowing down of the beams which results in a reduction of F.

The basic concept behind the mirror-stellarator configuration is the idea that the relatively cold bulk plasma can be isotropic in velocity distribution and be contained in a stellarator but that the hot component of injected deuterons—which is difficult to contain in a stellarator—will be contained in a mirror section of the stellarator, the inherent losses of the mirror being minimized by the stellarator connection. See MATT-841.

Although the presence of a departure from the heretofore known Maxwellian ion energy distribution is implicit in the system of this invention, the required distribution is not unstable against microinstabilities. For example, assuming again that $\tau_{h1} >> \tau_{hc}$, the steady-state distribution function $f_h$ in terms of energetic ion velocity v follows from $f_h v\, dW/dt = \text{const.}$ and Eq. (2). It is seen to be monotonically decreasing with v and, therefore, stable against micro-instabilities.

In respect to the hydromagnetic equilibrium and stability of the system of this invention, the two-component departure thereof from the heretofore known one-component Maxwellian toroidal plasma columns has the advantage that the required total plasma pressure of the systems of this invention is substantially lower than for the heretofore known one-component systems. This is the case mainly because the plasma energy is concentrated in the energetic injected particles rather than being distributed amongst the deuterons, tritons and electrons of the conventional magnetically confined plasma columns known heretofore. Therefore, while the usual one-component reactor design for the above-mentioned tokamaks are slightly marginal in respect to the heretofore known hydromagnetic modes (see for example "Proceedings Nuclear Fusion Reactors Conference", Brit. Nucl. Energy, Soc., London, 1969, p. 194, the lower pressure of the two-component systems of this invention render it amply safe in this regard.

In respect to limitations by various density-gradient and temperature gradient-driven micro-instabilities known heretofore, including the trapped particle modes described in the above-mentioned Nucl. Fusion publication, the two-component system of this invention has the advantage of operating with relatively low target-plasma temperatures and short energy confinement times. Similar consideration applies with respect to radiation and charge-exchange losses.

Additionally, the target-plasma parameters required are not far removed from those already realized. For example, the bulk plasma target density is below that required heretofore in the conventional one-component toroidal systems. Also, the bulk target plasma of this invention can start at a temperature below the desired final temperature.

In contrast to the large output level of conventional toroidal reactors of the prior art, the two-component system of this invention has its principal usefulness in the range of moderate output powers of 1000 megawatts of electrical power or less, which is virtually inaccessible to the standard prior art toroidal reactor. For this purpose, the highly efficient production of neutral beams, within the range 100–1000-A current at 100 to 300 keV is within the reach of the present state of the art, e.g., as shown by BNL 50310.

Figure 4:
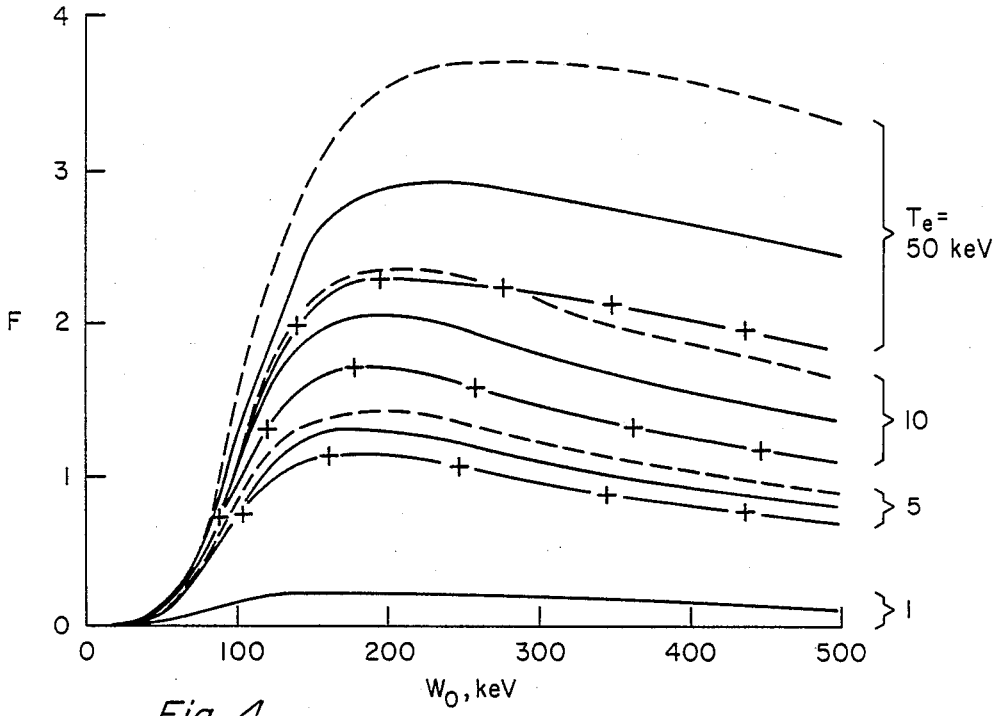
FIG. 4 is a graphic illustration of the energy release from the bombardment of a neutral beam against a magnetically confined bulk plasma; the ratio F=(nuclear energy release)/(initial deuteron energy $W_0$) is given as a function $W_0$ for a target plasma of cold tritions and various electron temperatures $T_e$. The reduction of F due to the presence of a loss cone is estimated roughtly by considering deuterons of 55° ("mirror ratio=3") or 35° ("mirror ratio=1.5"), respectively.

Referring now to FIG. 4, this figure illustrates the ratio F=(nuclear energy release)/(initial deuteron energy $W_o$) as a function of $W_o$ for a magnetic mirror confined target plasma of cold tritons of various electron temperatures $T_e$. The reduction of F due to the loss cone of the mirror is estimated roughly by considering deuterons to be lost after they have entered the cone by having scattered through mean angular deviations of 55° ("mirror ratio=3") or 35° ("mirror ratio=1.5"). In FIG. 4, the dashed line indicates "no scattering", i.e., mirror ratio=∞; the solid line indicates a mirror ratio=3; and the line with crosses indicates a mirror ratio=1.5. It can be seen, from FIG. 4, that an F factor of over 2 results for the advantageous mirror ratio of 3 at $T_e$=50 keV, with an initial injection energy $W_o$ of over about 150 keV.

Figure 5:
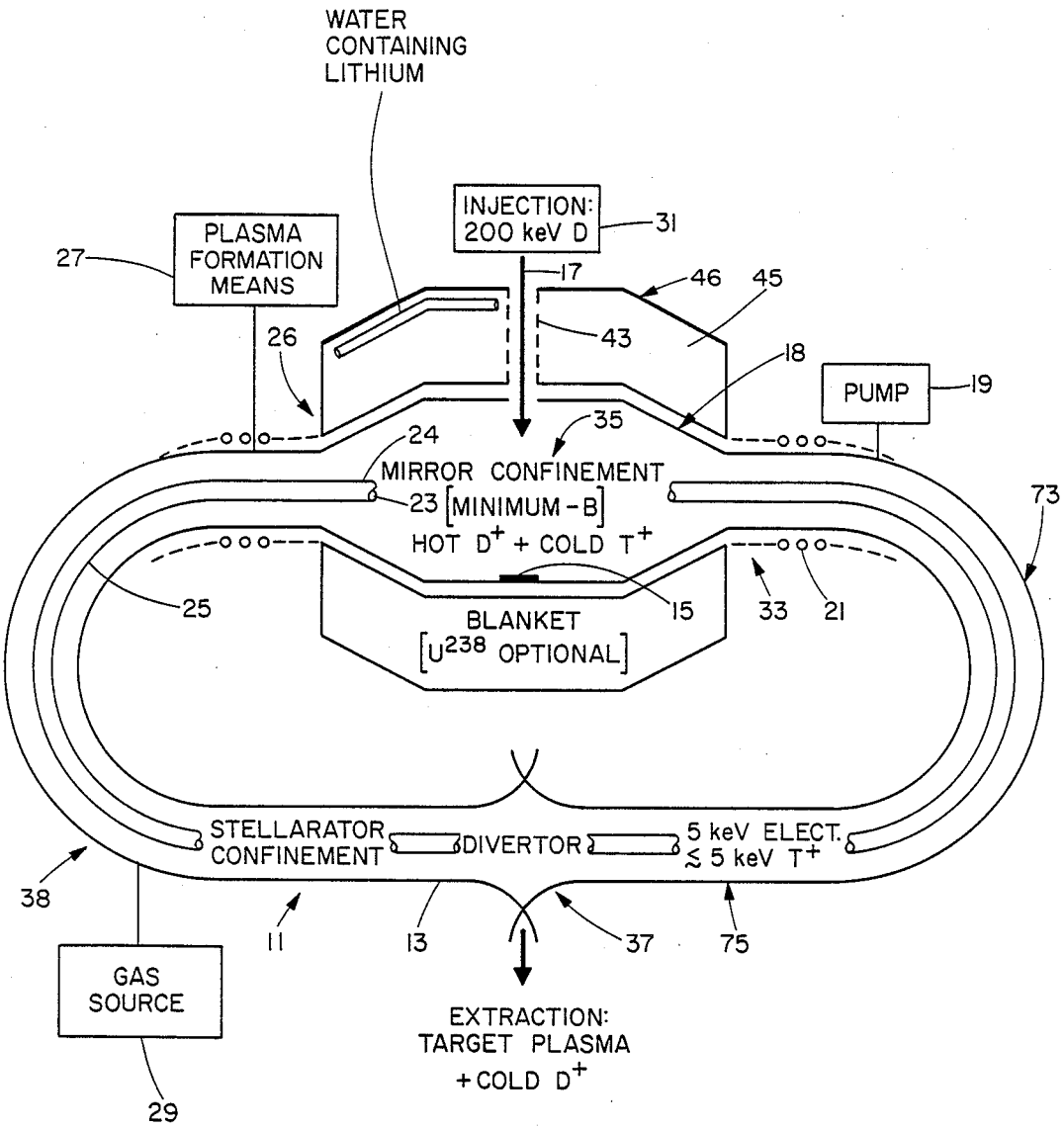
FIG. 5 is a partial top view of one embodiment of a hybrid stellarator-mirror machine system in accordance with this invention.

An embodiment of the mirror-stellarator is shown schematically in FIG. 5. This embodiment 11 comprises a non-symmetric, endless, toroidal, non-magnetic, race track-shaped, confinement tube 13, that is made, for example, in a plane from a cylindrical circular niobium tube having an inside portion forming a getterer and beam dump 15 for the linearly injected neutral beam 17, which is injected transverse to the axis of the tube 13. The tube 13 is shaped to include an enlarged cross-sectional target area 18 and is evacuated to a conventionally low pressure of $10^{-8}$ torr by a combination of conventional mechanical, ion, cryoabsorption and/or other pumps 19. A conventional axial coil 21 encircles the entire length of the tube 13 to produce parallel field lines around the axis of the confinement tube 13 so as to confine, collimate and hold a plasma in endless, toroidal co-axial magnetic confining surfaces 24 forming a plasma column 25 along the endless axis of tube 13.

Figure 6:
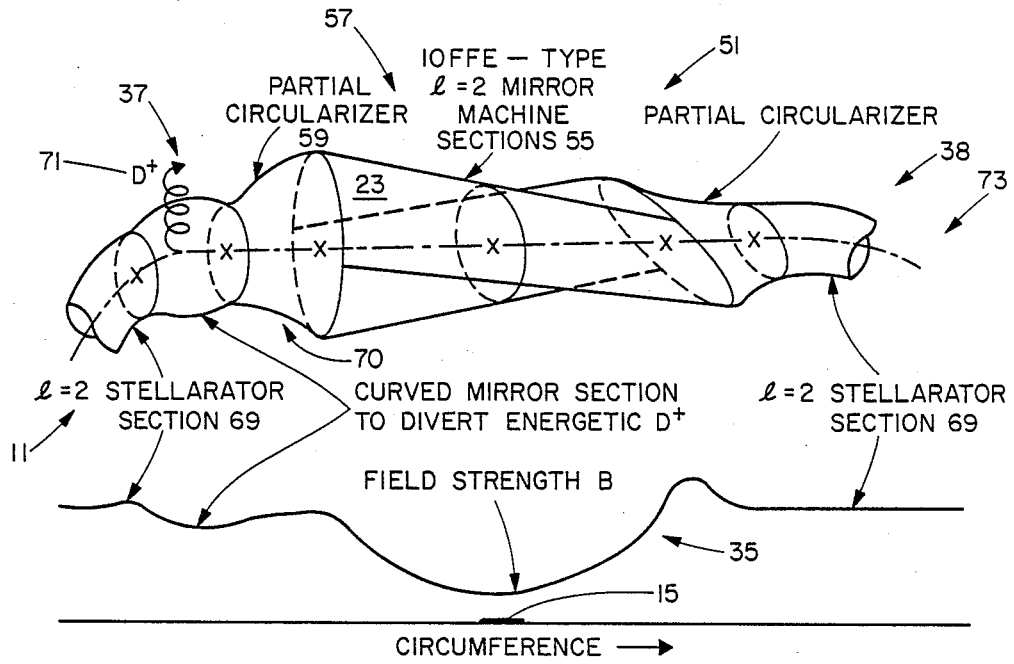
FIG. 6 is a partial three-dimesional view of Ioffe-type quadrupoles having magnetic mirrors.
Figure 6:
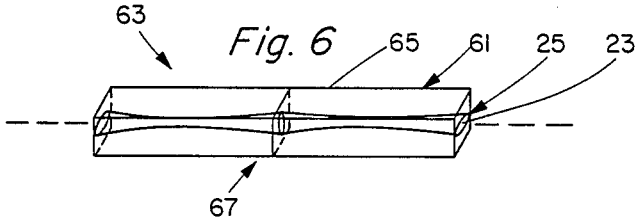

Also, this coil 21 forms a magnetic mirror 26 for restraining the plasma column 25 in a magnetic mirror field in the target area 18 by providing suitable coils 21 in the region of the magnetic mirror 26. In this regard, the field strength along the axis of tube 13 in one embodiment is from about 50–150 kG, with extra coils of coil 21 forming high field areas at the ends of magnetic mirror 26 as indicated in FIG. 6.

A plasma is formed in an endless collimated plasma column 25 in the magnetic surfaces and between the high field regions of the magnetic mirror 26 by conventional in situ plasma formation means 27, such as the ratio-frequency, and/or the ohmic and ion cyclotron resonance heating means described and shown in the above-mentioned patents, although other well-known heating means may alternately be used. A suitable gas source 29 provides a low pressure gas, e.g., tritium gas, in the endless confinement tube 13. Then the plasma forming and heating means 27 heats the gas to form a triton bulk plasma of the desired temperature.

Advantageously, the bulk target plasma in one example of this invention comprises 5 keV electrons and <5 keV tritons, and an injected neutral beam 17 from a 200 keV source 31 is transmitted into the bulk trition plasma 23 mid-way between the high field sections 33 of the mirror confinement section 35. The neutral beam produces fusion reactions in this bulk plasma by the direct collisions permitted during the time the energetic injected deuterons are slowed down after their injection into this bulk target plasma column 25.

A conventional divertor 37 may be used to extract the cold deuterons after they have been slowed down in a relatively cold bulk triton target plasma 23. To this end, the relatively energetic deuterons tend to move to the outside of the plasma column 25 at a rate corresponding to the deuteron injection rate, and, due to a curve in the axis of column 25 that is described in more detail hereinafter in connection with confinement sections 38, are removed by divertor 37 at a corresponding rate.

The injected beam 17 from source 31 enters tube 13 through a hole 43 in a blanket 45 around target area 18 in tube 13, which serves several purposes. One novel purpose is to provide fissionable material, such as $U^{238}$ in blanket 45, although thorium 232 may alternately be used in blanket 45. To this end, this fissionable material is used around tube 13, as shown in FIG. 5, for purposes of F efficiency. For example, the $U^{238}$ in blanket 45 absorbs neutrons from the plasma column 25, thereby enriching it. In this regard, as described and shown on page 92-238-22 of BNL 325, Sup. No. 2, February '65, $U^{238}$ fissions upon the impact of neutrons having sufficiently high energies. To this end, the neutrons produce by this invention, e.g., due to the interaction of D+T, there is produced 14.06 MeV neutrons for which the $U^{238}$ fission cross-section ($\sigma_F$-Barns) is about 1.3. This is significant because $U^{238}$ is relatively plentiful, which is illustrated by the fact that each 100,000 atoms of natural uranium include 6 atoms of uranium 234, 711 atoms of uranium 235, and 99,283 atoms of uranium 238. From the above, it will be understood that this invention provides a fusion-fission hybrid reactor, which makes available large amounts of energy from $U^{238}$. Neutrons from fissioning $U^{238}$ may be used to breed tritium used in the reactor through the reaction $Li^6+n \rightarrow He^4+T$. An advantage of the mirror stellarator configuration is that the blanket need nonly be in the mirror region and need not surround the whole plasma. Likewise, the $U^{238}$ can absorb neutrons for breeder purposes.

In operation, the blanket 45 also contains a water containing lithium jacket, whereby neutrons from the reaction ion particles in plasma 23 are trapped in the jacket to produce tritium for fueling the bulk plasma 23. A lead shield 46 around blanket 45, protects the coils 21 and the cooling means therefore, which advantageously provides a cryogenic cooling fluid for cooling the coils 21 to superconductor temperatures.

As contemplated by FIG. 6, which illustrates one embodiment of the confinement sections 35 and 38 of the apparatus 11 of FIG. 5, there is disposed around the outside of the endless evacuated, plasma containing confinement tube 13 a series 51 of Ioffe-type l=2 mirror sections 35 arranged at periodic intervals along the length of the confinement tube 13 and having partial circularizers 59 at each of the opposite ends thereof. Such circularizers 59 are understood from U.S. Pat. No. 3,230,145 by Furth et al., which illustrates one form of a suitable circularizer. Alternate circularizer configurations are shown in FIGS. 3–5 of U.S. Pat. No. 3,012,955 by Kulsrud and Spitzer.

The Ioffe-type l=2 mirror sections 35 of this invention comprise periodic, square-shape, current cages 61 and periodic quadrupoles 63 rotated 90° in successive stages, each formed from four parallel, equally spaced, longitudinally extending conductors 65, as shown in FIG. 6*a*. They are arranged in cross-section at the corners of a square around the confinement tube 13 and have opposite currents in their adjacent conductors moving around the perimeter of the square. Such alternating current directions are described in U.S. Pat. No. 3,278,384, by Leonard et al. Advantageously, the quadrupoles 63 are arranged, as illustrated in FIG. 4 (a') on page 82 of "Advances in Plasma Physics", Vol. 1, by A. Simon and W. B. Thompson, Interscience Publishers, Division of John Wiley and Sons, N.Y., 1968, to provide a minimum average-B configuration without internal conductors. To this end, the periodic quadrupoles 63 have a straight basic field $B_o$, on which is superimposed the periodic fields of the cages 61, which have rods 67 that produce circulatory components around the flux tube formed from the described magnetic surfaces, thus to provide periodic magnetic mirror sections like sections 35 along the axis of the confinement tube 13 and the plasma column 25 contained therein.

FIG. 6*a* illustrates the transition between the magnetic confinement sections 35 and the curved stellarator sections 73, which have conventional l=2 helical windings described in the above-mentioned Leonard et al., patent. To this end, ends 70 of the above described l=2 Ioffe mirror section 35, which have straight quadrupole conductors rather than helical quadrupole conductors, are connected to the l=2 stellarator section 73 by the partial circularizers 59. Advantageously, the field strength in confinement tube 13 is the same in the helical l=2 stellarator swections 73 as at the high field sections of the mirror confinement sections 35. Hence, the volume of the plasma column 25 can be kept moderate even though the length of plasma column 25 is considerable. Moreover, this invention removes the energetic deuterons, such as the D+ ions identified by reference number 71, due to the cure in the axis in tube 13 by providing curved mirror confinement. In this regard, as the turning point of the deuteron 71 approaches a tilted mirror confinement section, the deuteron 71 tends to make large verticle excursions for collection at the edge of plasma column 25 by divertor 37. This configuration will also give preferential removal of reaction products which can be put through direct converters to recover their energy.

In operation, the two component stellarator 11 of this embodiment of this invention, provides energetic first component deuterons 71 and a second component of relatively cold (e.g., 5 keV triton containing tritium) target plasma in column 25, wherein the injected particles and the background and plasma particles in the confinement tube 13 interact by collision and Lorentz ionization and charge exchange. The stellarator embodiment of this invention, however, avoids the "disc" type loss cone of the heretofore known stellarator by providing a "point" type loss cone at the ends of the magnetic mirror sections 35 and sections 38. In contrast, in has been difficult in the stellarators known heretofore to avoid the typical stellarator loss cone without going to large aspect ratios of major radius R/minor radius a. In this regard, particles with low collision rates tend to escape from the plasma by B-drift soon after they enter the loss cone, whereas particles with high collision rates (i.e., those that scattered before B-drifting through an appreciable radial distance) tend to be well confined.

Advantageously, the target plasma in the column 25 of this invention can be prepared by an initial ohmic stellarator heating current in a long, thin race-track shaped beam of toroidal plasma particles in column 25, after which the power of the injected deuteron beam 17 maintains the target plasma temperature, and a steady state hybrid stellarator mirror magnetic field maintains the plasma density in a steady temperature state. This embodiment is particularly advantageous, since by separating the reaction region from the rest of the torus, the hybrid stellarator 11 of this invention lends itself not only to convenient divertor operation, but also to convenient refueling. The relatively different plasma components of this embodiment comprise energetic (hot) deuterons confined in a minimum magnetic mirror and a cold triton target plasma in a stellarator section having curved mirrors that separate energetic deuterons which escape from the mirror region of the target plasma. A cold ion current flows radially inward to maintain the charge neutrality of the target plasma, and the bulk of the injected dueteron energy goes into the target plasma for recovery through a divertor.

The two-component hybrid stellarator mirror machine configuration of this invention calls for low ion temperatures well suited to benefiting from collisional closing of a single-particle loss cone and electron temperatures high enough to escape resistive instabilities.

In review, the two-component stellarator of the embodiment 11 of this invention is non-axisymmetric, i.e., race track-shaped with curved end loops 73 connected by straight tube sections 75, the only disadvantage of non-axisymmetry being the loss of energetic ions through B drift. The stellarator 11 of this invention has the advantages that it primarily holds a target plasma, and the plasma has a low ion temperature; also, the blanket 45 and neutron shielding 46 need only extend over the mirror section 35 of the stellarator 11, thus avoiding one of the principal technical objections to the use of helical windings outside the blanket; the Lawson criterion is considerably relaxed, thus providing a smaller acceptable radii in plasma column 25; and according to theoretical considerations, the minimum-B-type magnetic mirror confinement of section 35 and stellarator section 38 have a strong favorable effect on the low-frequency plasma instabilities known heretofore. The preferred operating condition of the embodiment 11 of this invention is with equal energy in the hot and cold components thereof, whereby the hot component is localized in the minimum-B magnetic mirror sections 35, which serves to "clamp" any flute-liked perturbations within the entire system, i.e., along the entire plasma column 25.

One actual high efficiency neutral beam source that can be employed for the neutral beam injection of this invention employs the above-described neutral beam, but other conventional neutral beams may alternately be used having energies of 100 keV up to 1.5 MeV and currents of up to 1000 A. The neutral beam source has an ion source and neutralizing means, as described in co-pending application, now U.S. Pat. No. 3,742,219 to post et al., which is assigned to the assignee of this application.

Suitable ion sources for the neutral beam source may be of any appropriate type that is capable of yielding a well-collimated beam, for example the Duo-Plasmatron type. However, other suitable ion sources comprise the "Calutron" type ion source or the like used for prior art controlled fusion reactors. Another advantageous ion source for the neutral beam source of this invention is the Multiple Aperture Test Source ("MATS") disclosed in UCRL-50002-70, Lawrence Radiation Laboratory Report for period July 1, 1969, through June 30, 1970. Still further ion sources are described in BNL 50310.

In accordance with this invention, neutral beam source 31 described above and shown in the mentioned co-pending application may have a variety of conventional charge exchange neutralizing vapors conducted across the ion beam. Such vapors advantageously comprise $H_2O$ or $H_2$, but Cs, K, Rb, $H_2$ and other vapors may alternately be used, as is understood by one skilled in the art. The neutralizing vapor is directed up stream at an angle to the ion beam and the neutral beam is directed toward a beam dump 15 to prevent the neutral beam from raising the background plasma pressure.

Figure 7:
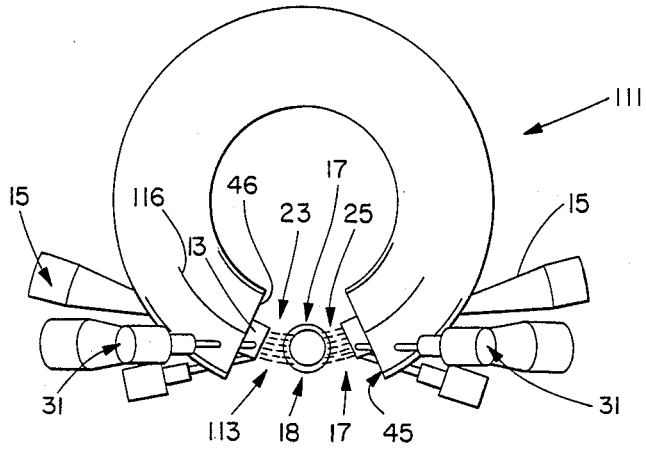
FIG. 7 is a partial top view of another embodiment of this invention which is incorporated in a tokamak.

Referring now to FIG. 7, in another embodiment of this invention, a tokamak 111 provides a relatively high target plasma density in a plasma 23 in target area 18 from about $10^{13}$ particles/cm$^3$ up to about $10^{14}$ particles/cm$^3$ in a toroidal plasma column 25. Also tokamak 111 provides a large plasma current 113 in a relatively strong axial magnetic field produced by axial magnetic toroidal field coils 21, such as known in the art and described above. In accordance with this invention an injected beam 117 of at least about 1 amp is provided for injection into the plasma of the plasma column 225 of tokamak 111. In this regard, once formed, the plasma may be maintained by continuous injection of beam 117.

Also, a cold-ion current flows radially inwardly to maintain charge neutrality during the time that mass, current and heat input are supplied by the injected beam.

An initial magnetically-induced heating current is advantageously employed in a tokamak geometry to prepare the target plasma, after which the power of the injected deuterons can be used to determine the target plasma temperature. One such current will be understood in the art from the ST tokamak at Princeton U. derived from the C stellarator, but reference can also be made to the air-core tokamak described in co-pending application Ser. No. 11,994, filed Feb. 17, 1970, by Shoici Yoshikawa, now U.S. Pat. No. 3,663,361.

Figure 8:
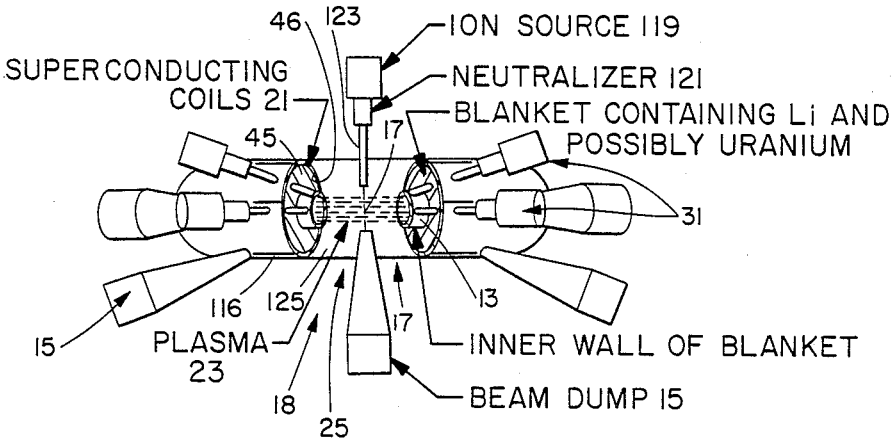
FIG. 8 is a partial side view of the apparatus of FIG. 7.
Figure 9:
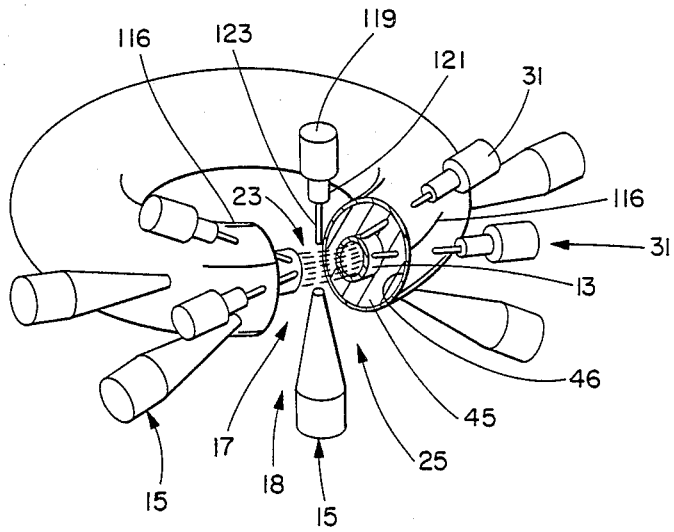
FIG. 9 is a partial three-dimensional view of the apparatus of FIG. 8.

In understanding the embodiment of the tokamak 111 of this invention shown in FIGS. 7–9, it will be understood that a large plasma current 113 limits the excursions of the energetic deuterons. Also, the high current in the tokamak 111 used in accordance with this invention subjects the energetic deuteron population only to point loss cones, whereby the energetic deuteron orbits can be kept small in the main magnetic field produced by axial toroidal magnetic field coils 221.

In operation, the tokamak 111 has axial toroidal magnetic field coils 221 for producing in combination with the well-known magnetically induced current 113 along the endless equilibrium axis of the toroidal plasma column 225 in a symmetric, toroidal, evacuated vacuum confinement tube 213, helical twisting field lines around the plasma column for confining the plasma column 225 in the tube 213. Advantageously, these axial toroidal magnetic field coils 221 comprise cryogenically cooled, multifilamentary, Nb-Ti superconductors imbedded in a mechanically stabilized matrix having a resistance higher than the resistance of the superconductors. These superconductors are formed from insulated cable in a potted braid that is wound into a suitable superconductor coil having a dewar, as described and shown in U.S. Pat. No. 3,177,408; however, $V_3Ga$ and $Nb_3Sn$ may also be used. In each case a lead shield 146 around the blanket 145 shield the cooled coils 221 from the neutrons produced in the plasma. Suitable longitudinally extending conductors 116 center the plasma column 225 in tube 213 and produce both a plasma current in and a centering field for plasma column 225. The conductors likewise employ cryogenically cooled Nb-Ti superconductors, which, however, are formed in a longitudinally extending curving geometry.

A plurality of neutral beam sources 131 are employed in accordance with the embodiment of this invention shown in FIGS. 7–9. These sources 131 comprise in one example deuteron sources 1119, neutralizers 121 and trasport tubes 123 that direct the neutral beams 117 linearly transverse to the axis of tube 213 at various angles and directly into repective beam dumps 115 that are lined up with each one of the respective beams 117. These beam dumps are made of niobium in the form of cups, since these niobium cups have an even higher gettering ability than identical titanium cups. The tube 123 also is made from niobium or has a niobium sleeve since this niobium also getters impurities, maintains a low background plasma density, has a low neutron capture cross-section for neutrons generated in plasma, has a high mechanical strength against atmospheric forces, and has a reasonable price and good availability due to the increased use of niobium containing superconductors. Also, a copper liner inside a tokamak like 111 is no longer required for helping to center the plasma column in the tokamak.

While the above has described one source 131, it is understood that other suitable sources may be used for injecting linear neutral beams 117 into the plasma so long as they produce an isotropic distribution function in the target area 118 of the bulk target plasma.

The blanket of tokamak 111, like the above-described blanket 45 in the embodiment 11 of FIG. 5, advantageously contains fissionable materials, e.g., Uranium-238 or thorium-232, which as described above, fissions under the influence of the neutrons generated in the plasma. To this end, the blanket 145 surrounds at least a portion of the target area 118 and the plasma column 225 in the plasma confinement tube 213. Here again the target area 118 advantageously has a large cross-sectional area, such as illustrated above, but for case of explanation it is shown as part of a symmetric confinement chamber 125. Moreover, blanket 145 also contains lithium in water that circulates in blanket 145 to absorb neutrons for the production of tritium that it used for fueling the bulk plasma which is extracted from the lithiated water by conventional chemical recovery means.

Figure 10:
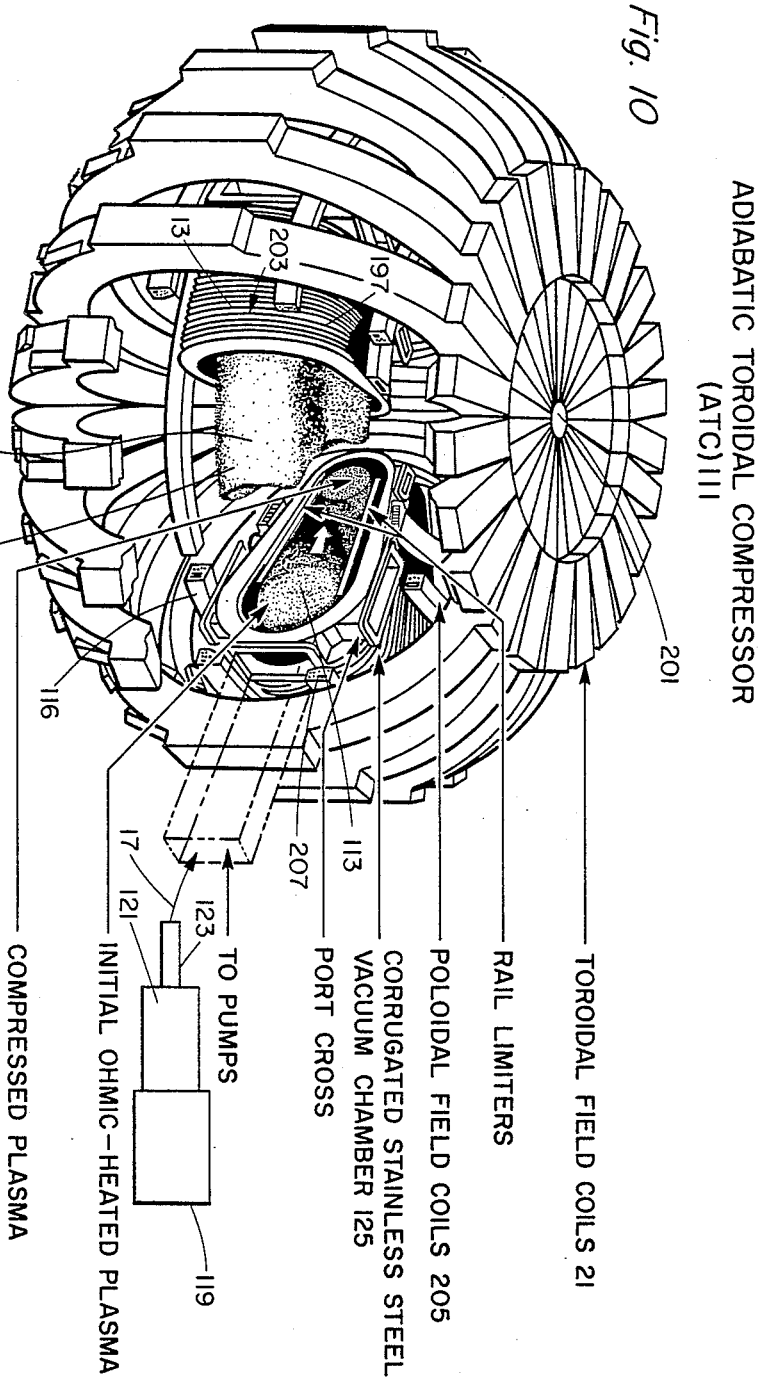
FIG. 10 is a three-dimensional view of another embodiment.
Figure 11:
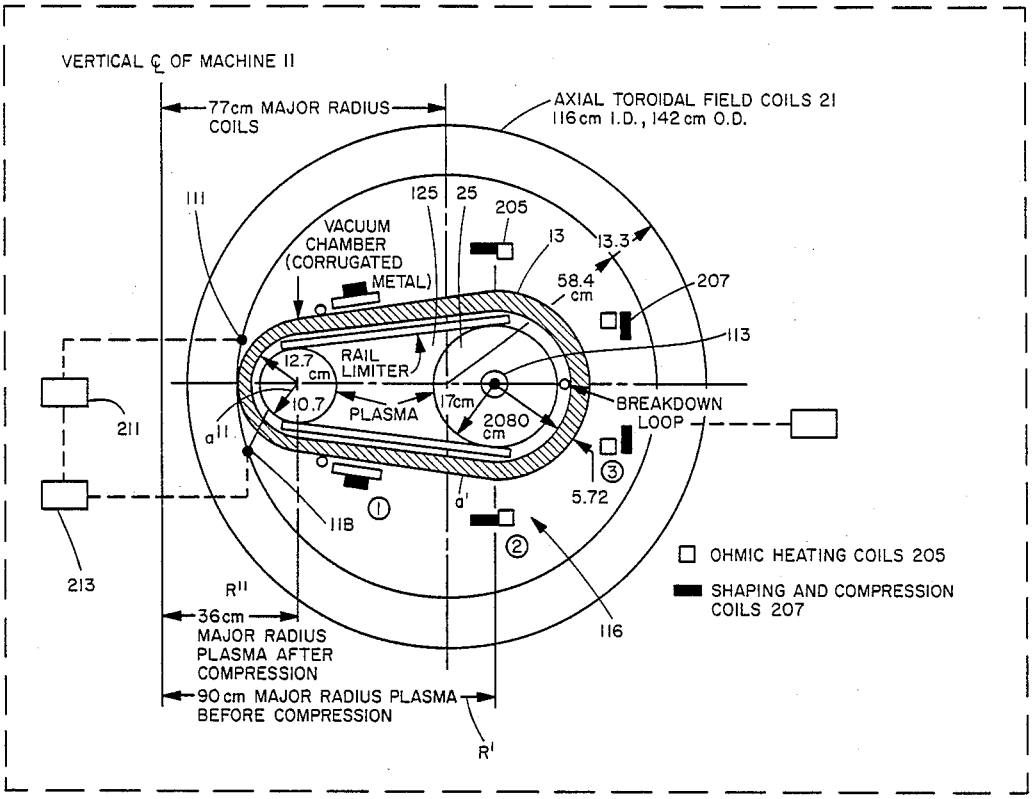
FIG. 11 is a partial cross-section of FIG. 10.
Figure 12:
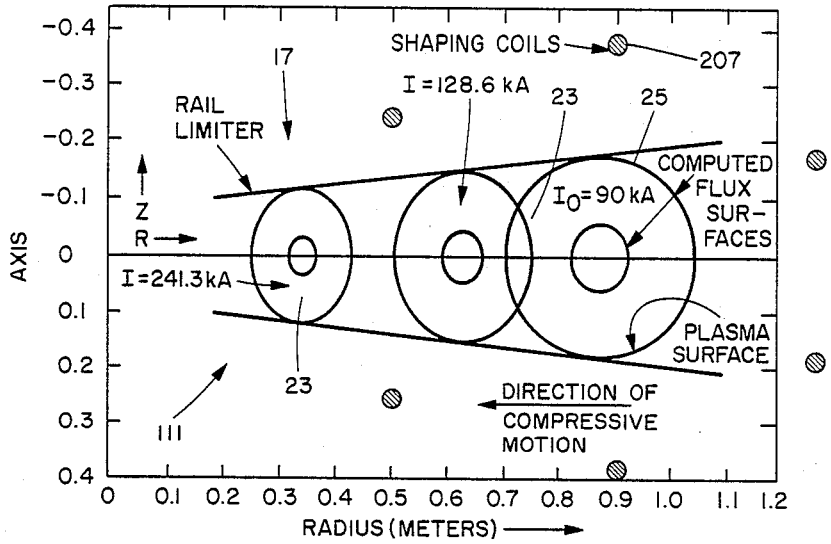
FIG. 12 is a partial schematic view of the dimensions of the plasma column of FIG. 11.
Figure 13:
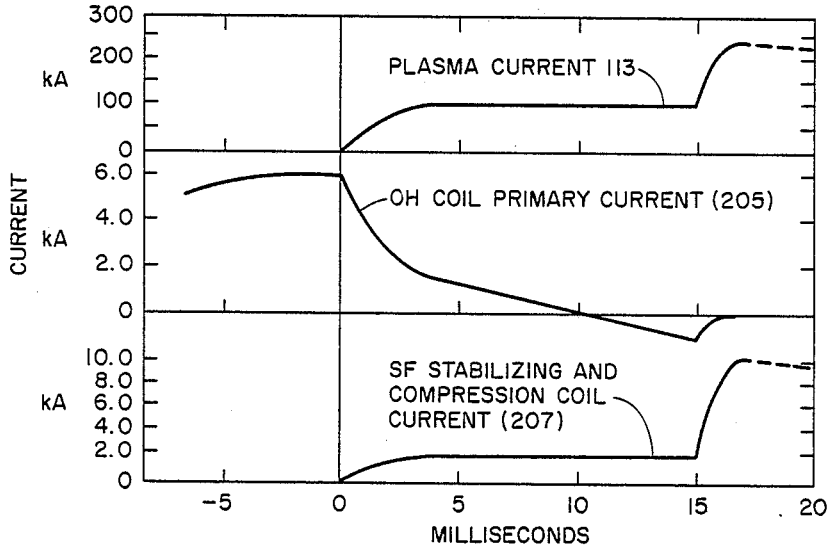
FIG. 13 is a partial schematic illustration of the energization of the apparatus of FIG. 10.
Figure 14:
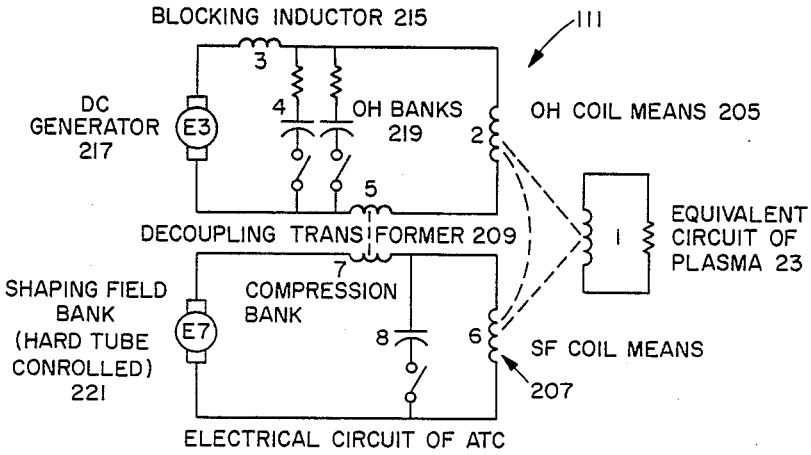
FIG. 14 is a partial schematic circuit diagram for FIG. 13.

Referring more particularly to the operation of the above-mentioned tokamak 111 in connection with this invention, a tokamak that provides adiabatic toroidal compression is advantageous, such as is shown in FIG. 10. Such a tokamak is described by a coinventor of this invention in U.S. Pat. No. 3,702,163. In a practice example of this embodiment of this invention shown in FIG. 10, which corresponds to the ATC built at the Princeton Plasma Physics Laboratory, the contained tube 213 is corrugated and made at least in part from a strong material, such as stainless steel. However, niobium, or alternately titanium or vanadium can be used due to their low neutron cross-sections, strength, and gettering abilities, particularly since this invention can provide high, energetic neutral fluxes. To this end, oppositely curving, ring-shaped annular U-shaped sections of tube 213 press together at their opposite edges to form a bellows-shaped, vacuum tight chamber 1225. The finished tube 213 has an inwardly elongated shape wherein fan-shaped grooves 197 provide a symmetrical arrangement in vertical planes passing through the center of annulus 201 of the tokamak 111.

Critical factors in the design and fabrication of the tube 213, comprise support for the atmospheric forces, procedures for assembly in the tokamak 111 and minimization of eddy currents. Consequently, the container tube 213 comprises 0.030 inch thick walls in the form of corrugations 203 having a depth to pitch ratio of about 6, resulting in an equivalent for determining ohmic resistance of about 0.005 inch thickness in the case of non-corrugated stainless steel. As described in Princeton PPL Report MATT-847, by applying a suitable magnetic field normal to the plane of plasma current 113, the major radius shrinks to about 0.4 of its original value, thereby resulting in an increase both in temperature and density. For example, one toroidal field strength used in the device is 50 kG at a 35–37 cm major radius for locating a 241 kA magnetically induced plasma current 113 in plasma after compressing it. In this example, the initial plasma current 113 has about a 5 ms use time, with a thermalizing time of up to about 20 ms, and a compression time of about 2 ms.

In this embodiment of FIG. 10, the axial toroidal field is produced by axial (TF) toroidal magnetic field coils 221 having 24 ten turn coils with an outside diameter of 142cm set on a radius of 77 cm. The machine is split in halves, each having its own support, to permit easy assembly of the two sections of tube 213 that encloses the vacuum chamber 125. FIGS. 11–14 show the operation of this embodiment.

Poloidal coils 205 and field shaping (SF) and compression coils 207 are used for initially magnetically inducing the plasma current 113 and centering the plasma column 225. In this regard, the field shaping and compression coils 207 provide a vertical field for maintaining the plasma in equilibrium at an initial large major radius during the build-up of the plasma current 113 and to drive the plasma in 225 inward during compression. In one example, a typical initial current is I=90 kA and after compression I=241 kA.

A suitable decoupling transformer 209 may be used to reduce cross-talk between the coils 205 and coils 207 sufficiently to allow minor corrections in the various circuits for the described coils, and for connecting them to a power supply having a suitable control system, and to allow adjustments in the plasma current 113 during compression. One suitable basic power supply is described in NYO-7899 (1957). In this regard, the induction current can be selectively reduced virtually to zero at the end of the compression phase. To this end also, the field shaping and compression coils 207 have an automatic programmed computer control 211 for controlling power source 213 so that the total flux at the beginning of the compression phase has a value consistent with the desired distribution of the plasma current 113 after the compression of the plasma in plasma column 225. With the change in the current in coils 205 for producing the plasma current 113 thus fixed, and with the change in the shaping and compression coils 207 also fixed, the mutual inductance between the two circuits is easily determined and the decoupling transformer 209 adjusts to meet these conditions. Meanwhile, a blocking inductor 215 protects the generator 217 of the power source 213 from the voltage surge produced by capacitor bank 219. A technical description of this is provided in the above-mentioned MATT report.

The resistivity of the plasma varies with temperature. Also, the plasma inductance, as well as the mutual inductance between it and the shaping and compression coils 207 and the poloidal field coils 203 varies with major and minor radii of the plasma in plasma column 225. Advantageously, conventional blocking diodes (not shown for ease of explanation) prevent current reversal in the low voltage capacitor banks 219 and 224 (E-7).

Although the ATC 111 of FIG. 10 superficially resembles the conventional tokomaks known heretofore, the design of the present device 111 of FIG. 10 provides a number of unique features. For example, the plasma in the endless toroidal plasma column 225, which in one example is heated to a first temperature by a magnetically induced plasma current 113 therein, is heated to higher temperature by adiabatic compression. The plasma column 225 may be compressed in both major and minor radii, as described, before the injection into the plasma of the neutral beam 117. This beam 117 which corresponds to the above-described beam 17, and accordingly is not described herein again, has the effect of directly producing fusion reactions in the bulk plasma of the ATC of FIG. 10 during the time permitted by the slowing down of the energetic injected ions in the bulk plasma. It is also understood that the neutral beam 117 can be injected into the plasma prior to compression. This causes the beam particles as well as the bulk plasma particles to gain energy from the compression with the attendant advantage that the neutral beam can be injected at a lower initial energy. As undersood from the above for example, deuterons injected by beam 117 produce head-on collisions with tritons in a bulk triton plasma to produce fusion reactions whose products are $He_4$ and 14.06 MeV neutrons. This will be understood by reference to FIG. 1. Moreover, after the adiabatic compression of the stable plasma column 225 produced by the described magnetic field and the described plasma current 113, the plasma has the necessary parameters for achieving high F factors, which were described above. In this regard, for example, the adiabatically compressed plasma column 225 has an electron temperature sufficient to produce significant F factors, as will be understood by reference to FIG. 2.

While this invention is not limited thereto, the parameters of the ATC at Princeton University are given by the following Table I:

TABLE I

| | |
|---|---|
| First Plasma Column 225 | |
| $n_e = 3 \times 10^{13}\ cm^{-3}$ | (electron density) |
| $k\ T_e = 600$ eV | (electron temperature) |
| $k\ T_i = 300$ eV | (ion temperature) |
| B = 20,000 gauss | (magnetic field strength) |
| I = 90,000 amperes | (plasma current 113) |
| a = 17 cm | (minor radius tube 213) |
| R = 90 cm | (major radius tube 213) |
| Compression time - 2 milliseconds to B = 50,000 gauss | |
| Compressed Plasma Column | |
| a = 11 cm | (minor radius) |
| R = 36 cm | (major radius) |
| $n = 2 \times 10^{14}\ cm^{-3}$ | |
| $k\ T_e = 200$ eV | |
| $k\ T_i = 1000$eV | |

In operation of this invention, tritium gas is admitted to tube 213 after the evacuation thereof to a conventionally low pressure. The gas is ionized to form a plasma by a suitable conventional rf source. The axial toroidal magnetic field coils 221 and the poloidal field coils 205 are energized to confine the plasma in a column 225 in tube 213, whereupon the shaping and compression coils 207 (see FIGS. 10 and 11) center the plasma column 225 in tube 213 and the plasma reduces in major and minor radii to produce a sufficient electron temperature for injection of beam 117. Thereupon the injection of beam 117 produces fusion reactions in an isotropic plasma in column 225 with a significant power output. In this regard, the neutrons produced are absorbed in a blanket 145, like the one described above for the production of power in the manner described above. This embodiment has the additional advantage, however, that the thermal power in the compressed plasma column 225 can be extracted by allowing this compressed column to re-expand against the field shaping and compression coils, whereupon this extracted energy can be utilized directly. Consequently the injected beam produces thermal energy in column 225 both by energy multiplication due to fusion and the thermalization of the beam 117 in the bulk plasma. In this regard, the injected beam supplies mass, current and/or heat energy to the bulk plasma so as to continuously maintain the temperature of the colum 225. Meanwhile, a radial inward flow of cold ions maintains charge neutrality in the plasma.

While the above has described the operation of stellarator and tokamak embodiments of this invention in which a deuterium neutral beam is injected into a triton plasma, it will be understood by one skilled in the art that the neutral beam 17 (117) and the bulk plasma 13 (213) can be varied in composition in accordance with this invention. For example, the beam 17 (117) can contain tritium and/or deuterium injected into a bulk deuteron or triton plasma. Likewise, a neutral beam of $He_3$ can be injected into a bulk trition and/or deuteron containing plasma in column 25 (225) or vice versa. $He_3$ has the advantage that it can react with deuterons to produce energetic protons and $He_4$. For example, 3.67 MeV $He_4$ and 14.67 MeV protons are produced that provide large cross-section reactions with the plasma constituents. Moreover, the energetic reaction products can collide with nuclei of the bulk plasma producing secondary energetic nuclei can further react with other nuclei of the bulk plasma giving a semi-chain reaction and enhancing the power of the reactor 111 of FIG. 10. Thus, it will be understood that the injected beam and the bulk plasma comprise electrons, protons, and neutrons arranged to produce fusion reactions comprising the above-mentioned reactions, as well as the following well-known reactions listed in Table II:

TABLE II

| | |
|---|---|
| D + T | $He_4$ (3.52 MeV) + n (14.06 MeV) |
| D + D | $He_3$ (0.82 MeV) + n (2.45 MeV) |
| D + D | T (1.01 MeV) + p (3.03 MeV) |
| D + $He_3$ | $He_3$ (3.67 MeV) + p (14.67 MeV) |

In review of the above, this invention provides a power output from fusion reactions by injecting a neutral beam of reactive nuclei into a bulk plasma. The beam is ionized and trapped by the bulk plasma. In this regard for efficient trapping the product nl should $10^{16}$ (n is the density of the target plasma and l is the length of the path of the beam through the plasma). During the time permitted by the slowing down of the injected beam, collisions with the nuclei of the bulk plasma produce fusion reactions. In this regard, head-on collisions are provided that produce fusion, as illustrated by FIG. 1, and a sufficient electron temperature is provided, as illustrated by FIG. 2, to provide significant power output, as illustrated by the described F factor. To this end, the specific stellarator-tokomak embodiments provided in accordance with this invention as described above, provide sufficient times for the slowing down process of the injected nuclei (i.e., a sufficient thermalization time) to provide significant F factors. In this regard, the neutral beam injection is provided in such a way as to provide an isotropic trapped ion component from the injected nuclei. Moreover, this invention provides additional novel means for increasing the power output, comprising provision for a fissionable blanket and extraction of the thermal energy from the plasma itself by re-expansion of the plasma column. Additionally, this invention provides a variety of targets and injected neutral beams for producing specific reactions, comprising a large cross-section reaction involving a $He_3$ beam injected into a deuterium plasma producing energetic $He_4$ and protons which collide with the deuterons of the target plasma producing energetic deuterons which can react with other deuterons of the target plasma to produce a semi-chain reaction. Such a semi-chain reaction can also be initiated by injecting tritium into a deuterium plasma.

It will also be understood that this invention contemplates pulsed operation in the tokamak embodiment of continuous operation in the stellarator embodiment. This invention comtemplates a neutral beam injection that maintains the bulk plasma temperature by injection. Proper injection of the beams will also maintain the toroidal plasma current for tokamak operation through transfer of beam momentum to the plasma electron. Likewise, this invention contemplates both pulsed (tokamak) and continuous (stellarator) plasma currents in the plasma column for stably confining the plasma column 25 (225). In this light it will understood that the operation of this invention is consistent with, and the specific apparatus described can be adapted for use with a variety of isotropic, toroidal, bulk plasmas with or without a plasma current flowing therein during the described neutral beam injection thereinto.

Further, this invention comtemplates the continuous or pulsed extraction of energy through a divertor, or other direct or indirect power production means, and the production of tritium for fueling the reactor of this invention.

Likewise, this invention has the advantage that it can be used with a large variety of heating and stabilization means, such as the electromagnetic heating of the plasma as contemplated by the co-pending application by Dawson, the coinventor herein, whose application Ser. No. 193,749, now U.S. Pat. No. 3,779,864, is assigned to the assignee of this application, and/or the feedback or dynamic injection means for mass, momentum and/or energy described in the co-pending application Ser. No. 12,310, now U.S. Pat. No. 3,668,066 and Ser. No. 226,566, now U.S. Pat. No. 3,733,248, both assigned to the assignee hereof.

Still further, this invention contemplates direct or alternating currents in 2n pole stellarator windings. In this regard, the use of a.c. in the described helical stellarator windings provides an apparatus that is alternately a stellarator and a tokamak, as described by Furth, the coinventor herein, in MATT-759.

What we claim is:

1. A two-component plasma for producing energy from fusion reactions within the plasma comprising:

a bulk plasma of tritium ions and electrons having a substantially Maxwellian energy distribution, said electrons having a temperature of at least 4 keV; and an energetic deuteron population within said bulk plasma, said deuteron population being produced by injection of deuterium having an initial energy of at least 120 keV into said bulk plasma.

2. A method of producing a two-component plasma for producing energy from fusion reactions within the plasma in a magnetic confinement device comprising the steps of:

producing a bulk plasma of tritium ions and electrons having a substantially Maxwellian energy distribution within the confinement device, said electrons having a temperature of at least 4 keV; and producing an energetic deuteron population within said bulk plasma by injecting deuterium into said bulk plasma, said deuterium having an initial energy of at least 120 keV.

3. The method of claim 2 wherein the magnetic confinement device is a tokamak.

4. The method of claim 2 wherein the magnetic confinement device is a stellarator.

5. The method of claim 2 wherein the magnetic confinement device is a mirror machine.

6. The method of claim 2 wherein the magnetic confinement device is a stellarator-mirror machine.

7. Apparatus for producing a two-component plasma for producing energy from fusion reactions within the plasma in a stellarator-mirror magnetic confinement device comprising:

means for producing a bulk plasma of tritium ions and electrons having a substantially Maxwellian energy distribution within the magnetic confinement device, said electrons having a temperature of at least 4 keV; and means for producing an energetic deuteron population within said bulk plasma, said means including means for injecting deuterium having an initial energy of at least 120 keV into the mirror portion of the magnetic confinement device.

* * * * *